Jan. 26, 1960  R. L. HACKMAN ET AL  2,922,868
GAS SHIELDED INTERNALLY COOLED ELECTRODE WELDING TORCH
Filed March 5, 1957
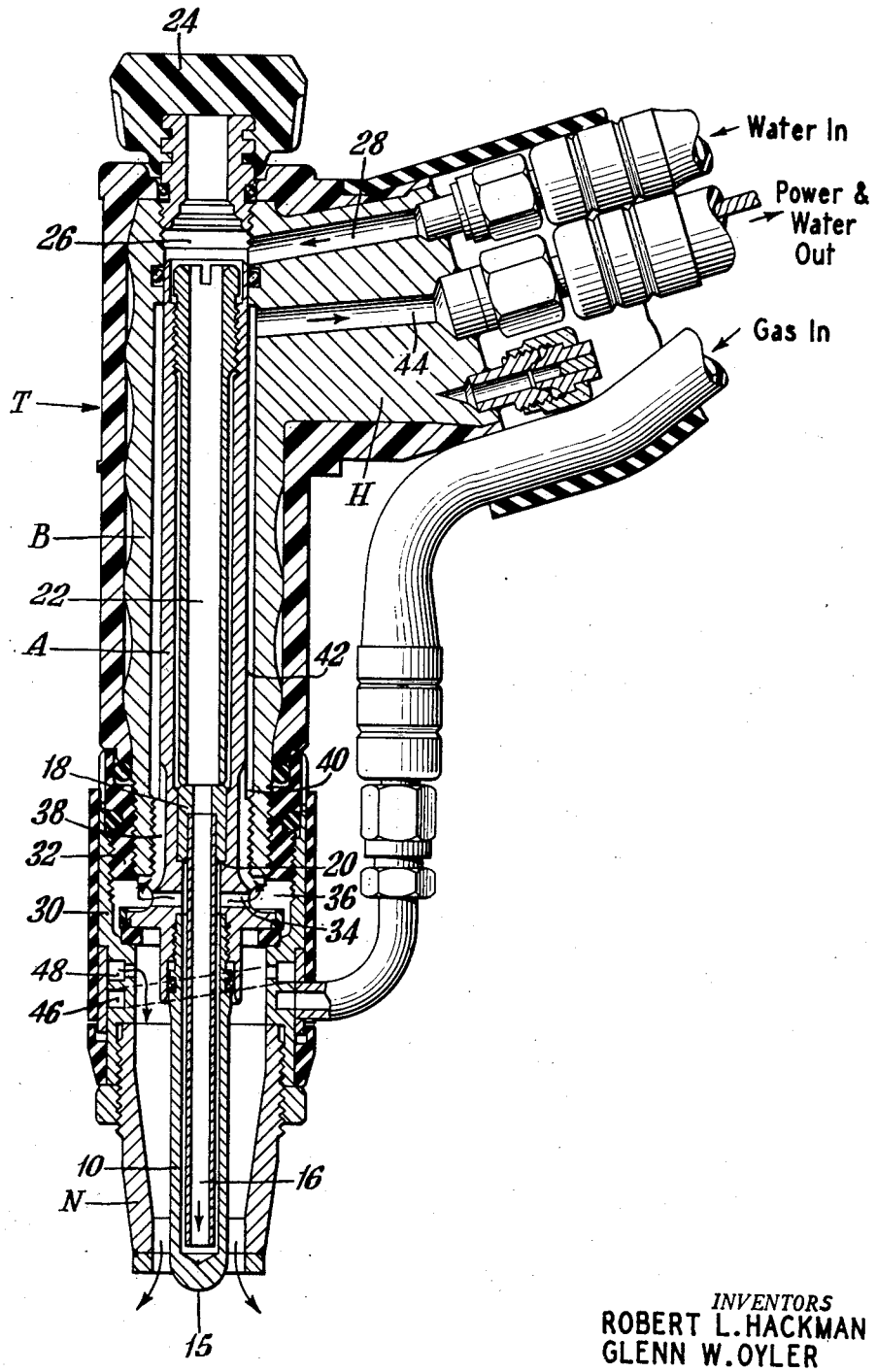
INVENTORS
ROBERT L. HACKMAN
GLENN W. OYLER
BY Richard S. Shreve Jr.
ATTORNEY United States Patent Office 2,922,868
Patented Jan. 26, 1960

2,922,868

GAS SHIELDED INTERNALLY COOLED ELECTRODE WELDING TORCH

Robert Linford Hackman, Morris Plains, and Glenn W. Oyler, Springfield, N.J., assignors to Union Carbide Corporation, a corporation of New York Application March 5, 1957, Serial No. 643,993

6 Claims. (Cl. 219—75)

This invention relates to gas shielded internally cooled electrode welding torches, and more particularly to apparatus for carrying out the method according to the copending application of O. H. Nestor, Serial No. 448,407.

In welding with a tungsten electrode shielded with inert gas, straight polarity is used for welding stainless steel, copper, and similar metals. Not so with aluminum and magnesium which require the cleaning action of reverse polarity. But reverse polarity is not available because the heat would require too large a diameter for the electrode.

The state of the commercial art is a compromise by using alternating current giving penetration on the straight polarity cycle, and cleaning action on the reverse polarity cycle. But the change of polarity each cycle loses the arc. Hence superimposed high frequency is employed for stabilization.

The main object of the present invention is to provide a torch with an internally cooled gas shielded electrode to permit the use of high density reverse polarity current with 100% cleaning action so essential in working on aluminum, and with an electrode diameter not too large to enter the gas cup and still leave room for adequate gas shielding.

Another object is to provide an internally cooled copper electrode with a wall thickness at the arcing tip in equilibrium between the cooling effect of the fluid and the melting off effect of high density reverse polarity current on the arcing tip.

A further object is to provide a torch with a cooling fluid passage having a restricted cross-sectional area near the arcing tip, to increase the velocity of fluid in contact therewith, and enlarged cross-sectional area all the way to and from said restricted area to avoid resistance to flow other than that necessary to provide the high velocity adjacent the arcing tip.

In the drawing the single figure is a vertical cross section through a gas shielded internally cooled electrode welding torch according to the preferred embodiment of the present invention.

The apparatus for gas shielded arc welding shown in the drawing comprises a torch T having a hollow current and cooling fluid supplying head H, and an electrode holder barrel B having a bore receiving an electrode holder A. A gas confining nozzle N is mounted on the lower end of the electrode holder barrel B.

A hollow electrode 10 is carried by the holder A, and depends therebelow within the nozzle N and terminates in an arcing tip 15. A smaller tube 16 extends down inside the hollow electrode 10 and terminates in an open end short of the arcing tip.

In the form shown, the hollow electrode is integrally constructed all of the same metal such as copper, and the upper end is screwed into the bottom of the bore of the electrode holder A and gasketed with an O ring to form a fluid-tight joint. The inner tube 16 has an enlarged head 18 which, when the tube is inserted in the top of the bore of the electrode holder, engages an internal shoulder near the bottom of the bore, the tube therebelow going on down inside the electrode.

Above the tube head 18 inside the bore of the electrode holder is inserted a larger tube 22, the top of which is threaded into the top of the holder bore. Tightening these threads causes the tube 22 to press the head 18 firmly down onto the shoulder 20. The top of the holder bore is closed by a screw plug 24, the space therebelow and above the holder A forming a water chamber 26. The head H is provided with a water passage 28 leading to the chamber 26 from a water hose inlet.

The nozzle N is secured to the barrel B by means of a water jacket 30 and an insulating sleeve 32. The bottom of the bore in the holder B is at least the diameter of the inside of the electrode 10, and is provided with radial drillings 34 connecting this bore with a water chamber 36. The holder A is screwed into the bottom of the torch barrel, and has longitudinal grooves 38 connecting the chamber 36 with an annular chamber 40. The chamber 40 is connected by longitudinal passages 42 between the holder and the barrel, to a water outlet passage 44 in turn connected to the power-in and water-out cable hose.

The small internal diameter of the tube 16, the short distance between the end of this tube and the arcing tip, and the small cross-sectional area of the annular space between the tube 16 and the inside of the electrode 10, result in a restricted cross-sectional area near the arcing tip 15 to increase the velocity of the cooling fluid in contact therewith. The cooling fluid passage means in the torch has an enlarged cross-sectional area all the way to and from this restricted area to avoid resistance to flow other than that necessary to provide the high velocity adjacent the arcing tip.

Thus the incoming water passage 28, chamber 26, and hold-down tube 22 all have greater cross-sectional area than the inner tube 16, and the outgoing water passages 34, chamber 36, grooves 38, passages 42 and 44 all have greater cross-sectional area than the annular space between the inner tube 16 and the inner diameter of the electrode 10.

Shielding gas is supplied by a hose secured to the head H and leading to an annular chamber 46 in the water jacket 30 from which the shielding gas flows through ports 48 distributed around the chamber into the top of the nozzle N.

The outside surface of the bottom of the tip 15 forms the arcing surface. The bottom of the hollow in the electrode forms the high velocity cooled inside surface of the arcing tip. The wall thickness of the copper between the outer arcing surface and the cooled inner surface is in equilibrium between the burn off power of the high density reverse polarity current and the cooling power of the high velocity cooling fluid. This thickness is less than the diameter of the arcing tip.

The necessity of supplying the cooling fluid in one direction and returning it in the opposite direction all within the confines of the hollow electrode, and still leaving space for the annular stream of shielding gas, requires the tube wall of the electrode 10 above its arcing tip and the wall of the tube 16 therein to be as thin as possible. Thus the thickness of the tube wall of the electrode 10 is less than the thickness of the arcing tip, and the thickness of the wall of the tube 16 is less than its internal diameter.

The optimum dimensions for different sizes of electrode are as follows:

| Electrode | | Water Tube | | Water Flow Area | |
|---|---|---|---|---|---|
| O.D. | I.D. | O.D. | I.D | Inlet | Outlet |
| 0.375 | 0.250 | .187 | .143 | .0162 | .0215 |
| 0.298 | 0.218 | .165 | .135 | .0145 | .0160 |
| 0.186 | 0.147 | .109 | .085 | .0058 | .0076 |
| 0.124 | 0.086 | .065 | .047 | .0017 | .0025 |

This application is a continuation-in-part of our copending application Serial No. 458,346, filed September 27, 1954, now abandoned.

What is claimed is:

1. Gas shielded arc welding torch for use with high density reverse polarity current comprising a barrel, an electrode holder in said barrel, a gas directing nozzle depending below said holder to an outlet orifice, a hollow electrode longer than said nozzle carried by said holder and depending therebelow within said nozzle and terminating in an integral arcing tip, a smaller tube of uniform internal diameter carried by said holder and longer than said hollow electrode extending down therein close to said arcing tip but terminating in an open end short of said arcing tip, and cooling fluid passage means in said torch extending down through said smaller tube under said open end and substantially uniformly distributed therearound and on back up through the annular space between said inner and outer tubes and on through an annular space between said holder and said barrel, the small internal diameter of said smaller tube, the short distance between said smaller tube and the arcing tip, and the small cross sectional area of the annular space between the tube and the inside of the electrode resulting in said cooling fluid passage means having a restricted cross-sectional area near said arcing tip to increase the velocity of fluid in contact therewith, and enlarged cross-sectional area all the way to and from said restricted area to avoid resistance to fluid flow other than that necessary to provide the high velocity adjacent the arcing tip, the wall thickness at the arcing tip being substantially in equilibrium between the cooling effect of the cooling fluid and the melting-off effect of the high density reverse polarity current on the arcing tip.

2. Gas shielded arc welding torch for use with high density reverse polarity current comprising a barrel, an electrode holder in said barrel, a gas directing nozzle depending below said holder to an outlet orifice, a hollow electrode longer than said nozzle secured to the bottom of said holder and depending therebelow within said nozzle and terminating in an integral arcing tip, a smaller tube of uniform diameter carried by said holder and larger than said hollow electrode extending down therein close to said arcing tip but terminating in an open end short of said arcing tip, an upper tube in said electrode holder bearing on said smaller tube for holding the same in position and for supplying cooling fluid thereto, and passage means in said torch for discharging cooling fluid from the top of said hollow electrode and outside of said electrode holder and inside of said barrel to the cooling fluid outlet of the torch, the wall thickness at the arcing tip being substantially in equilibrium between the cooling effect of the cooling fluid and the melting-off effect of the high density reverse polarity current on the arcing tip.

3. For use in a gas shielded arc welding torch for use with high density reverse polarity current comprising a barrel, an electrode holder in said barrel and a gas directing nozzle depending below said holder to an outlet orifice, the improvement which comprises a hollow copper electrode longer than said nozzle and having an externally threaded upper end adapted to be screwed into the lower end of said holder and depend therebelow inside said nozzle and terminating in an integral arcing tip at the bottom of said electrode, the uniform outside diameter of said hollow electrode below said holder being sufficiently smaller than the inside diameter of said nozzle to leave therebetween an annular passage for shielding gas, a smaller tube of uniform internal diameter and of greater length than said hollow electrode and having a cooling fluid passage therein extending from said holder down close to said arcing tip, and said hollow electrode forming a continuing passage returning back up to said holder the annular space between said tube and electrode having a radial dimension less than the internal diameter of said smaller tube, the copper wall thickness of said arcing tip below the bottom of said cooling fluid passage being substantially in equilibrium between the cooling effect of the cooling fluid and the melting-off effect of the high density reverse polarity current on the arcing tip and less than the diameter of said arcing tip.

4. Gas shielded arc welding torch for use with high density reverse polarity current comprising a barrel, an electrode holder in said barrel, a gas directing nozzle depending below said holder to an outlet orifice, a hollow electrode longer than said nozzle carried by said holder and depending therebelow inside said nozzle, the hollow of said electrode terminating short of the lower end of said electrode a distance less than the outer diameter of the electrode to form an integral arcing tip at the lower end of the electrode, and a smaller cylindrical tube longer than said hollow electrode in concentric relation therewith and extending down therein close to said arcing tip but terminating in an open end short of said arcing tip, the radial distance between said tube and electrode being smaller than the axial distance between the lower ends thereof and cooling fluid passage means in said torch for passing cooling fluid down through said smaller tube under said open end and substantially uniformly distributed therearound and on back up through the annular space between said smaller tube and said hollow electrode, the wall thickness at the arcing tip being substantially in equilibrium between the cooling effect of the cooling fluid and the melting-off effect of the high density reverse polarity current on the arcing tip.

5. Gas shielded arc welding torch for use with high density reverse polarity current comprising a barrel, an electrode holder in said barrel, a gas directing nozzle depending below said holder to an outlet orifice, a hollow electrode longer than said nozzle carried by said holder and depending inside said nozzle, said hollow electrode comprising a thin walled tube closed at the bottom to form an arcing integral tip, and a smaller tube of uniform diameter carried by said holder and longer than said thin walled tube in concentric relation therewith and extending down therein close to said arcing tip but terminating in an open end short of said arcing tip, cooling fluid passage means in said torch for passing cooling fluid down through said smaller tube under said open end and substantially uniformly distributed therearound and on back up through the annular space between said inner and outer tubes the radial distance between said tubes being less than half the outside diameter of said inner tube, and means for supplying shielding gas to the annular space between the inner surface of said nozzle and the outer surface of said thin walled hollow electrode tube, the wall thickness at the arcing tip being substantially in equilibrium between the cooling effect of the cooling fluid and the melting-off effect of the high density reverse polarity current on the arcing tip.

6. Gas shielded arc welding torch for use with high density reverse polarity current comprising a barrel, an electrode holder in said barrel, a gas directing nozzle carried by said barrel and depending below said holder to an outlet orifice, a hollow electrode having an externally threaded upper end detachably secured to the lower end of said holder and a stem of uniform diameter longer than said nozzle depending below said holder inside said nozzle and terminating in an integral arcing tip, said holder having a bore with a decreased diameter at its lower end portion forming an annular shoulder, an electrode inner tube having a head in said holder bore engaging said shoulder and a stem depending therefrom of uniform internal diameter and longer than said hollow electrode to an open end short of the lower end of the electrode bore, a cooling fluid supply tube having an upper end threaded inside said holder bore and a lower end engaging said inner tube head and registering with the bore thereof, and cooling fluid passage means in said barrel for passing cooling fluid down through said cooling fluid supply tube, inner tube head and bore under said open end and back up through the annular space between the inner diameter of said electrode and the outside of said inner tube, the wall thickness at the arcing tip being substantially in equilibrium between the cooling effect of the cooling fluid and the melting-off effect of the high density reverse polarity current on the arcing tip.

References Cited in the file of this patent

UNITED STATES PATENTS

| | | |
|---|---|---|
| 1,687,081 | Chapman | Oct. 9, 1928 |
| 2,052,796 | Rava | Sept. 1, 1936 |
| 2,422,962 | Hensel et al. | June 24, 1947 |
| 2,587,331 | Jordan | Feb. 26, 1952 |
| 2,686,860 | Buck et al. | Aug. 17, 1954 |

FOREIGN PATENTS

| | | |
|---|---|---|
| 716,565 | Great Britain | Oct. 6, 1954 |